US006876640B1

United States Patent
Bertrand et al.

(10) Patent No.: US 6,876,640 B1
(45) Date of Patent: Apr. 5, 2005

(54) METHOD AND SYSTEM FOR MOBILE STATION POINT-TO-POINT PROTOCOL CONTEXT TRANSFER

(75) Inventors: Jean-Francois Bertrand, Montreal (CA); Bartosz Balazinski, Montreal (CA); Eric Dyke, L'Ile Perrot (CA)

(73) Assignee: Telefonaktiebolaget LM Ericsson, Stockholm (SE)

( * ) Notice: Subject to any disclaimer, the term of this patent is extended or adjusted under 35 U.S.C. 154(b) by 741 days.

(21) Appl. No.: 09/702,175

(22) Filed: Oct. 30, 2000

(51) Int. Cl.[7] .................................................. H04Q 7/00
(52) U.S. Cl. ....................... 370/331; 370/335; 370/338; 455/436; 455/442
(58) Field of Search ................................ 370/331, 328, 370/332, 333, 335, 338, 342, 352, 353, 354, 356, 395.52, 400, 401, 404, 441, 320, 351, 386, 390, 392, 405; 455/432.1, 433, 435.1, 436, 439, 440, 442

(56) References Cited

U.S. PATENT DOCUMENTS

| | | | | |
|---|---|---|---|---|
| 6,381,646 B2 | * | 4/2002 | Zhang et al. | ................. 709/227 |
| 6,385,451 B1 | * | 5/2002 | Kalliokulju et al. | ......... 455/437 |
| 6,404,754 B1 | * | 6/2002 | Lim | ............................ 370/338 |
| 6,580,699 B1 | * | 6/2003 | Manning et al. | ............. 370/331 |
| 6,651,105 B1 | * | 11/2003 | Bhagwat et al. | ............. 709/239 |
| 6,684,256 B1 | * | 1/2004 | Warrier et al. | .............. 709/238 |

* cited by examiner

Primary Examiner—Phirin Sam
(74) Attorney, Agent, or Firm—Jenkens & Gilchrist, P.C.

(57) ABSTRACT

A Point-to-Point protocol (PPP) session with a mobile station is initiated in a wireless communication system. The session is negotiated by a first Packet Data Service Node (PDSN), which creates a PPP context for the mobile station for the session. The PPP context is added to a PPP register, which stores the PPP context indexed by the International Mobile Station Identifier (IMSI) of the mobile station for later retrieval if needed. In the event the mobile station is handed over to a second PDSN, such as when the mobile station roams and the first PDSN cannot be reached, the second PDSN retrieves the stored PPP context using the IMSI of the mobile station so that the PPP session can be resumed without a need for a complete renegotiation of the PPP context. The PDSNs further periodically re-register or update the PPP context on the PPP register. At the expiration of the PPP session, the PDSN directs the PPP register to delete the saved PPP context so that a new PPP context can be created the next time the mobile station initiates a PPP session.

22 Claims, 3 Drawing Sheets

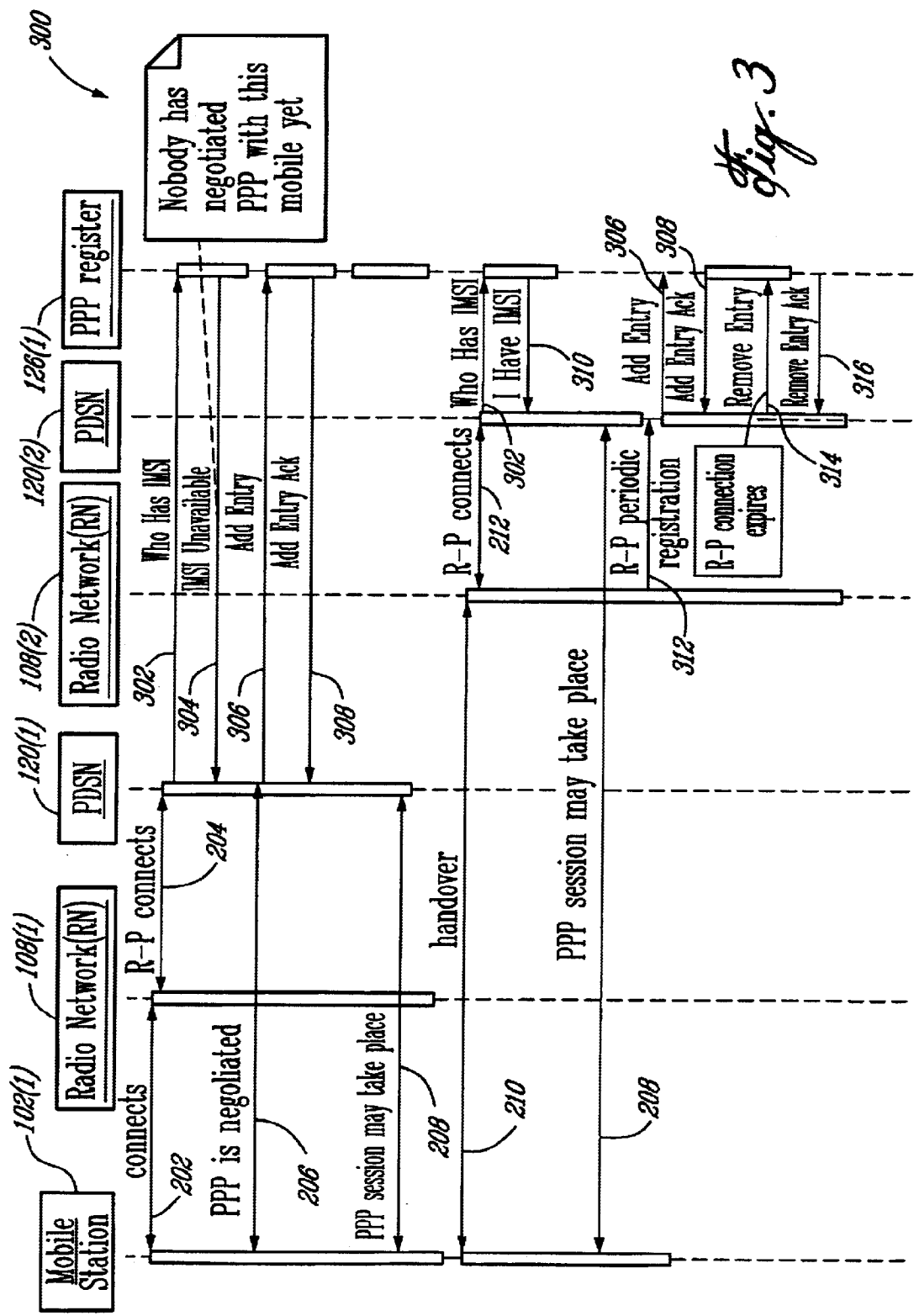

METHOD AND SYSTEM FOR MOBILE STATION POINT-TO-POINT PROTOCOL CONTEXT TRANSFER

TECHNICAL FIELD OF THE INVENTION

The present invention relates to wireless communications systems in general and, in particular, to the transfer and reuse of a Point-to-Point (PPP) context for a mobile station involved in a handover between two Packet Data Service Nodes (PDSNs).

BACKGROUND

Advancements in the fields of electronics and communications have permitted the introduction and commercialization of many new types of communication systems. Information can be affordably communicated to locations in manners previously not possible or affordable.

The field of cellular telephony is exemplary of a communication system that has been made possible due to such advancements. Communication using a cellular telephone or other radiotelephonic system is advantageous because a fixed, wireline connection is not required between a sending station and receiving station to permit communications to be effectuated therebetween. A cellular or other radiotelephonic communication system is therefore particularly advantageous to effectuate communications when the use of fixed or hard-wired connections would be inconvenient or impractical. Continued advancements in the field of cellular telephony, as well as other types of radiotelephonic communications, have permitted the introduction of new services and new forms of communication pursuant to already-installed cellular, and other radiotelephonic, networks.

Proposals have been set forth to provide existing cellular, and other communication networks, with the capability of communicating packet data. Information to be transmitted between a sending station and a receiving station is formed into discrete packets of data. Individual packets can be sent on a communication channel from the sending station to the receiving station. Because the information is communicated by way of discrete packets, the sending station need utilize the channel only during the time periods required to send the discrete packets. A channel is typically, therefore, a shared channel used by a plurality of sending stations.

To communicate a packet of data to a mobile station, the packet must be addressed with an identification address of the mobile station. An Internet Protocol (IP) address is exemplary of an identification address that can be used to address packets of data that are to be relayed to the mobile station. The IP address is, of course, utilized when transmissions are made pursuant to an Internet Protocol. Many different types of services have been implemented that are effectuated by the communication of packet data according to various other protocols.

The Point-to-Point Protocol (PPP) is a protocol that provides Point-to-Point access and enables networking over serial lines. PPP is the protocol used by the cdma2000 wireless communication standard for communications between, for example, mobile stations and Packet Data Service Nodes (PDSNs). The cdma2000 wireless communication standard is a third generation technology that increases data transmission rates in CDMA (code division multiple access) systems. A packet data transfer session between a mobile station and a PDSN is referred to as a PPP session.

Transmission Control Protocol/internet Protocol (TCP/IP) is the protocol of the Internet and has become the global standard for communications. TCP provides transport functions that insure that the total amount of bytes sent is received correctly. IP provides a routine mechanism. TCP/IP is a routeable protocol, which means that messages contain not only the address of a destination station, but also the address of a destination network. Every user in a TCP/IP network requires an IP address. In Simple IP, which is used by non-mobile Internet users, a new IP address is dynamically assigned every time a user negotiates a PPP session.

Mobile Internet Protocol (Mobile IP) is a protocol designed to support mobile Internet access. Mobile IP permits continuous network connectivity anywhere a mobile station happens to be located. Mobile IP is able to track a mobile station without having to change the mobile station's permanent IP address. Under mobile IP, data is transmitted to a permanent address of the mobile station, which is associated with a home agent of the mobile station. Most typically, when the mobile station is outside its home network, the home agent will forward data to the mobile station in care of a foreign agent through a process of encapsulating the data, most typically referred to as tunneling. Once the data packets are received by the foreign agent, the data will be de-capsulated and forwarded to the mobile station. In contrast to Simple IP, in Mobile IP users may keep their permanent IP address, which can be used each time the user negotiates a PPP session.

Layer Two Tunneling Protocol (L2TP) is a method for encapsulating standard PPP through a variety of media. L2TP also allows encapsulation of PPP using User Data Protocol (UDP) packets. L2TP supports non-IP protocols such as AppleTalk and IPX as well as LPSec Security Protocol. L2TP is implemented to provide secure, node-to-node communications in support of multiple, simultaneous tunnels in an IP-based network. L2TP offers PPP access to users from remote locations. In contrast to Simple IP, an L2TP user may keep a permanent IP address that can be used each time the user negotiates a PPP session.

When L2TP is used in cdma2000, an L2TP Access Concentrator functionality is performed by the PDSN to which the mobile station is connected. An L2TP Network Server is a separate node from the PDSN. In contrast to Mobile IP and Simple IP, under L2TP PPP negotiations are performed in two parts, a first part involving the L2TP Access Concentrator (i.e., the PDSN) and a second part involving the L2TP Network Server.

When a mobile station is engaged in a PPP session, the mobile station will often need to be handed over between different cells of a wireless communication system. Sometimes these handovers of the mobile station require that handling of the PPP session be transferred from a first PDSN to a second PDSN. Such inter-PDSN handovers typically occur when, following the handover, the radio network serving the mobile station cannot connect to the first PDSN such as, for example, when the radio network is not aware of the first PDSN, when the radio network belongs to an operator that does not wish to use the first PDSN, or when the network topology does not allow the radio network to reach the first PDSN.

In connection with an inter-PDSN handover, a PPP session begun prior to the handover must be completely renegotiated, even though most often the session parameters from the PPP session initiated with the first PDSN could be reused. These parameters (commonly referred to as a PPP context) could be reused because the session on the second PDSN will very frequently have the same characteristics as when the mobile station was being served by the first PDSN. The PPP includes several sub-protocols, each of which can include parameters such as, for example, compression, encryption, or character escaping. Once PPP negotiation of a PPP session has been completed, packet data payload can be transferred. The PPP context comprises negotiated values of the PPP parameters. Particular parameters included in the PPP context can differ from one implementation to another. The PPP context could consist, for example, of a table containing the following information: User identification (e.g., International Mobile Station Identifier), Sub-protocol Identifier (e.g., Link Control Protocol, Compression Control Protocol), Option (e.g., Escaped characters, Compression Protocol Identifier), Value (e.g., Escape only character X, use Y compression scheme). Of course, reuse of the parameters is not useful when Simple IP, rather than Mobile IP or L2TP is used, since in Simple IP a new IP address is assigned every time a user negotiates a PPP session.

Renegotiation of a PPP session of a mobile station as a result of an inter-PDSN handover is therefore often unnecessary and constitutes a significant waste of time and system resources. An interruption in packet data services to a mobile station due to the need to renegotiate such a session can take up to ten seconds. Such a delay may be long enough to cause failures in real-time applications that are running on the mobile station. There is accordingly a need for a method and system for transfer of a mobile station's PPP context when the mobile station undergoes an inter-PDSN handover.

SUMMARY OF THE INVENTION

A wireless communication system executes a Point-to-Point Protocol (PPP) session by negotiating the PPP session of a mobile station served by a first Packet Data Service Node (PDSN). The negotiation comprises creation of a PPP context relative to that mobile station. That PPP context is communicated to, and stored by, a PPP register. Responsive to a handing over of the mobile station from the first PDSN to a second PDSN, the previously-stored PPP context is retrieved from the PPP register and communicated to the second PDSN. The PPP session may be resumed through the second PDSN without having to create a new PPP context.

BRIEF DESCRIPTION OF THE DRAWINGS

A more complete understanding of the method and system of the present invention may be acquired by reference to the following Detailed Description when taken in conjunction with the accompanying Drawings wherein:

FIG. 3 is a messaging diagram illustrating an exemplary transfer and reuse of a PPP context following an inter-PDSN mobile station handover in accordance with the present invention.

To facilitate understanding, identical reference numerals have been used in the drawings, where possible, to designate identical elements.

DETAILED DESCRIPTION OF THE DRAWINGS

Figure 1:
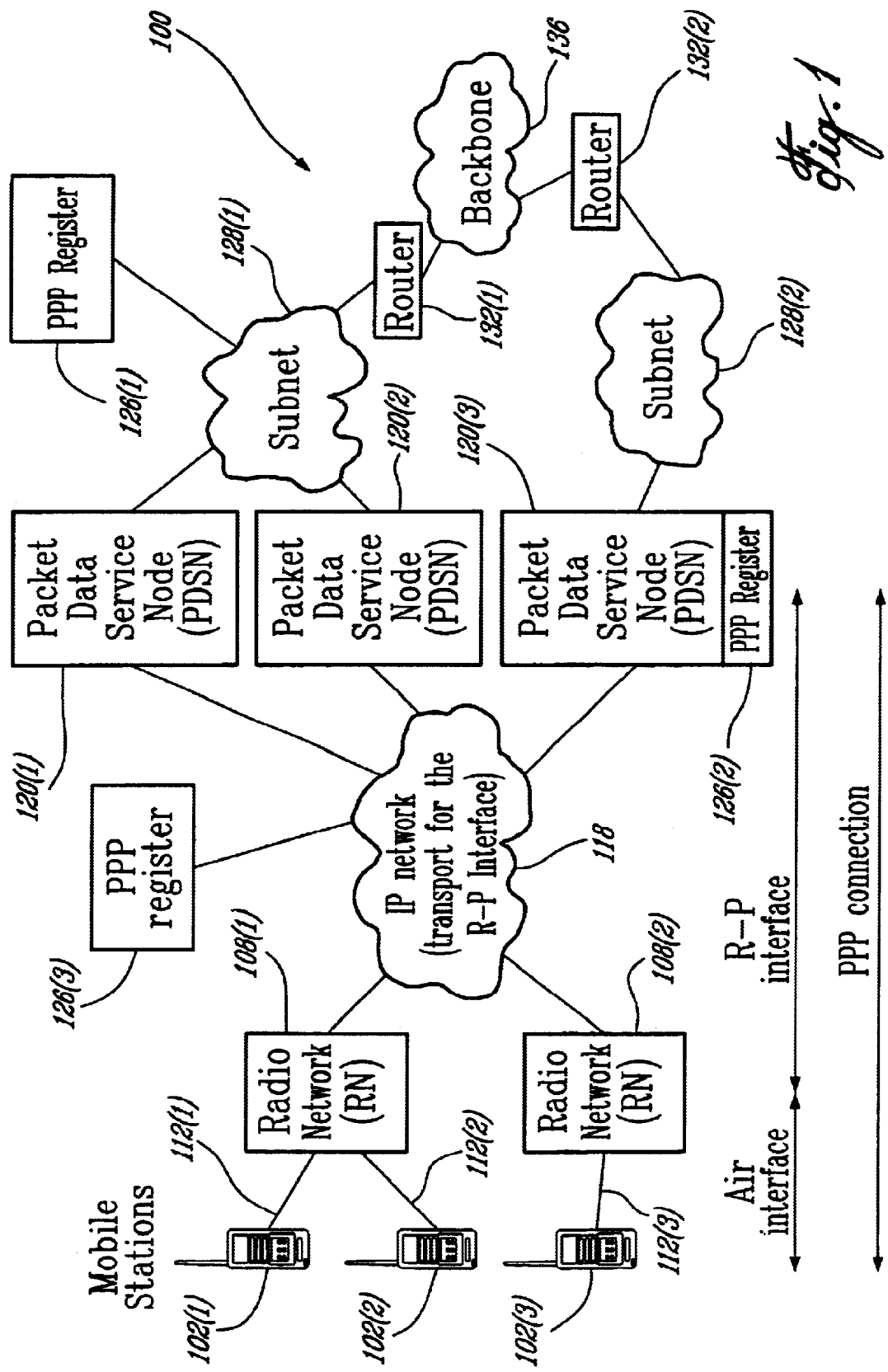
FIG. 1 illustrates an exemplary wireless communication system in accordance with the present invention.

Reference is now made to FIG. 1 wherein there is shown a wireless communication system 100 in accordance with the present invention. Mobile stations 102(1), 102(2) and 102(3) are shown connected to radio networks (RNs) 108(1) and 108(2), wherein the mobile stations 102(1) and 102(2) are connected to the RN 108(1) and the mobile station 102(3) is connected to the RN 108(2). Each of the mobile stations 102(1), 102(2) and 102(3) is connected to its respective RN 108(1) or 108(2) via an air interface, which is also referred to as a radio link. The mobile station 102(1) and the mobile station 102(2) are shown connected to the RN 108(1) via radio links 112(1) and 112(2), respectively. Similarly, the mobile station 102(3) is connected, via the radio link 112(3), to the RN 108(2).

The RNs 108(1) and 108(2) are shown connected to an Internet Protocol (IP) network 118, with the IP network 118 serving as an interface between the RNs 108(1) and 108(2) and a plurality of Packet Data Service Nodes (PDSNs) 120(1), 120(2) and 120(3). The interface provided by the IP network 118 between the RNs 108(1) and 108(2) and the PDSNs 120(1), 120(2) and 120(3), is referred to as the R-P interface. When a mobile station is involved in a PPP session using the air interface and the R-P interface, the connection is collectively referred to as a PPP connection. Also shown connected to the Packet Data Service Nodes 120(1), 120(2), and 120(3) are subnets 128(1) and 128(2). Connected to the subnets 128(1) and 128(2) are routers 132(1) and 132(2), which are in turn connected to a backbone 136.

The PDSNs 120(1), 120(2) and 120(3) are responsible for establishing, maintaining, and terminating PPP sessions with mobile stations such as the mobile stations 102(1), 102(2) and 102(3). The RNs 108(1) and 108(2) are responsible for relaying the PPP session data between the mobile stations 102(1), 102(2) and 102(3) and the PDSNs 120(1), 120(2) and 120(3). Because the mobile stations 102(1), 102(2) and 102(3) are able to roam, they can travel, for example, from a service area served by RN 108(1) to another service area served by RN 108(2). If roaming occurs while a mobile station is involved in a PPP session, the RN to which a mobile station has been handed over typically tries to avoid an inter-PDSN handover, which is a handover that requires service from a different PDSN to handle the PPP session than the PDSN providing service just prior to the handover. However, it is possible that, following the handover process, the mobile station may be served by a RN that, for a number of reasons, cannot reach the PDSN that was previously handling the PPP session of the mobile station immediately prior to the handover. It is in this inter-PDSN handover circumstance that, under the prior art, a complete renegotiation of the PPP context for the mobile station is required to continue the PPP session.

Figure 2:
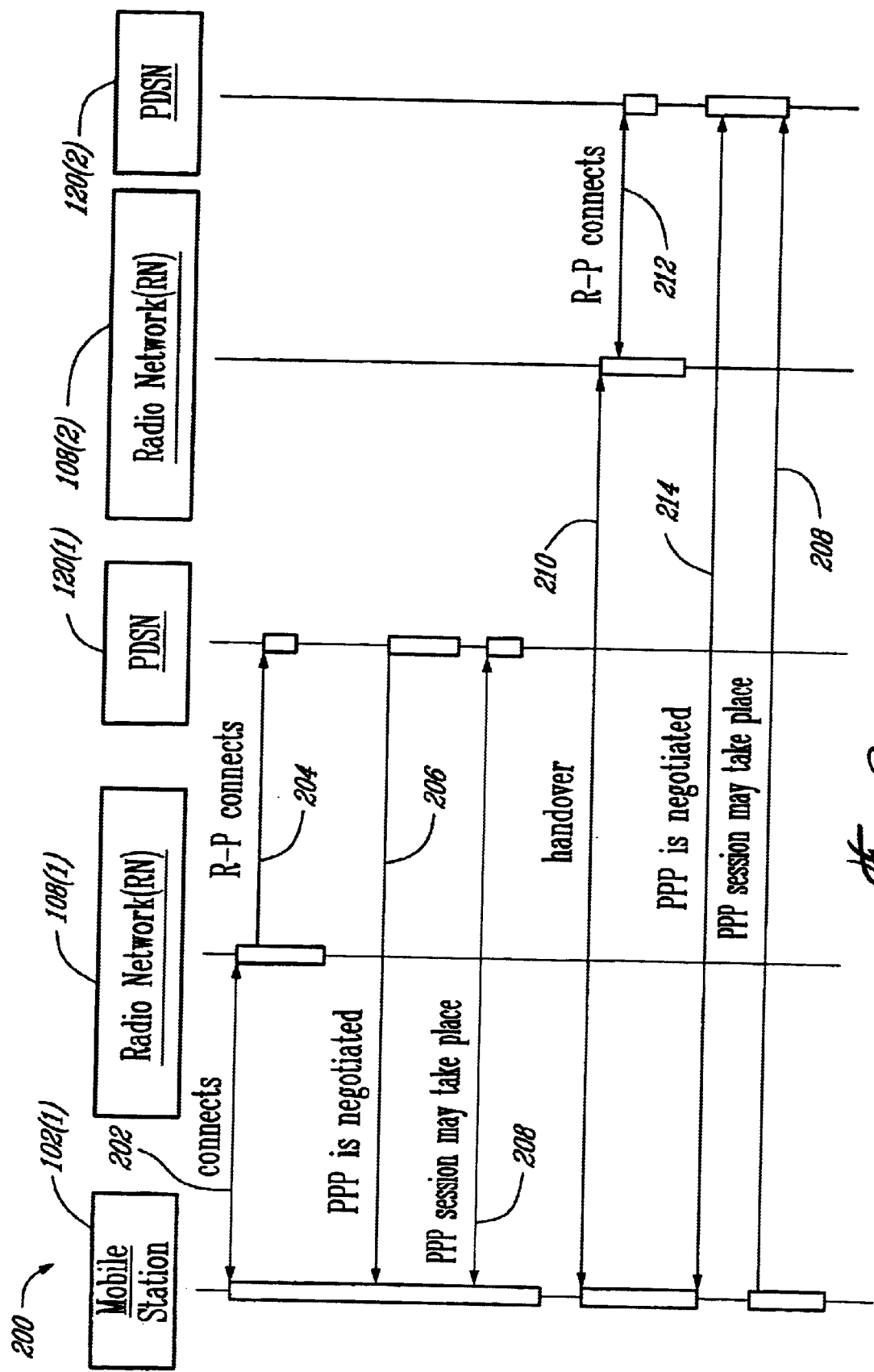
FIG. 2 is a messaging diagram illustrating an exemplary renegotiation of a PPP context following an inter-PDSN mobile station handover in accordance with the prior art.

Reference is now made to FIG. 2 wherein there is shown a messaging diagram 200 in accordance with the prior art by negotiation of a PPP context for a PPP session at a first PDSN 120(1), followed by an inter-PDSN handover of the mobile station 102(1) to a second PDSN 120(2), and a subsequent complete re-negotiation of the PPP context for the mobile station 102(1) through the second PDSN. When the mobile station 102(1), which is being served by the RN 108(1), desires to begin a PPP session, the mobile station 102(1) sends a connection message 202 to the serving RN 108(1). Responsive to receipt of the message 202, the RN 108(1) generates an R-P connection message 204 to the PDSN 120(1) (assuming that the PDSN 120(1) was selected by the RN 108(1)). Responsive to the R-P connection message 204, the PDSN 120(1) executes a PPP negotiation 206 through the RN 108(1) to the mobile station 102(1). The PPP negotiation 206 results in the creation of a first PPP context relative to the mobile station 102(1). In response to the PPP negotiation 206, the mobile station 102(1) begins the PPP session (using the first PPP context) through the RN 108(1) to the PDSN 120(1). Although the PPP negotiation 206 is represented by a single arrow in FIG. 2, it most typically comprises a plurality of messages.

When the mobile station 102(1) moves from a service area served by the RN 108(1) to a service area served by the RN 108(2), handover is accomplished, as represented by a message 210, in which the mobile station establishes a connection with the RN 108(2). Following the handover 210 of the mobile station 102(1) to the RN 108(2), if the RN 108(2) is unable to reach the PDSN 120(1), the RN 108(2) connects with another PDSN (assumed in this example to be the PDSN 120(2)) and sends an R-P connection message 212 to the PDSN 120(2). In response to the R-P connection message 212, the PDSN 120(2) performs a complete PPP negotiation 214 with the mobile station 102(1). In a similar fashion to that described above with respect to the negotiation 206, the negotiation 214 results in the creation of a second PPP context relative to the mobile station 102(1). The second PPP context is created without reference to the first PPP context. Following the negotiation 214 between the PDSN 120(2) and the mobile station 102(1), the PPP session 208 may be resumed. Although the PPP negotiation 214 is represented by a single arrow in FIG. 2, it most typically comprises a plurality of messages.

As noted above, following the inter-PDSN handover of the mobile station 102(1) between the PDSN 120(1) and the PDSN 120(2), the previously negotiated PPP session between the mobile station 102(1) and the PDSN 120(1) must be completely renegotiated without reference to the first PPP context, even though most often the session parameters from the PPP session between the mobile station 102(1) and the PDSN 120(1) (contained in the first PPP context) could be reused. Reuse of the first PPP context is desirable because the PPP session on the PDSN 120(2) will very frequently have the same characteristics of the PPP session between the mobile station 102(1) and the PDSN 120(1).

Thus, renegotiation of the PPP session involving the mobile station 102(1) unnecessarily consumes time and constitutes a significant waste of system resources. An interruption in packet data services to the mobile station 102(1) due to the need to renegotiate its PPP session following the inter-PDSN handover could take up to ten seconds. Such a delay may be long enough to cause failures in real-time applications running on the mobile station 102(1), especially in the cases of mobile IP and L2TP, in which the IP address of the mobile station remains the same regardless of which PDSN is used.

Referring again to FIG. 1, PPP registers 126(1), 126(2), and 126(3) are shown. PPP register 126(1) is connected to the subnet 128(1). The PPP registers 126(1), 126(2), and 126(3) can be used in accordance with the present invention to allow PPP contexts created during negotiation of a PPP session involving the mobile stations 102(1), 102(2) and 102(3) to be temporarily stored and subsequently retrieved if the mobile stations 102(1), 102(2) and 102(3) are involved in inter-PDSN handovers.

Although the PPP registers 126(1) and 126(3) are shown as standalone nodes connected to the subnet 128(1) and the IP network 118, respectively, the PPP registers 126(1), 126(2), and 126(3) can be located anywhere in the system 100 and can be co-located with or be a part of one of the PDSNs or of another part of the system 100. PPP register 126(2) is shown as a part of the PDSN 120(3). There may be a single PPP register 126 or a plurality of PPP registers 126 in the system 100 as needed.

If the mobile station 102(1) desires to begin a PPP session, it will communicate with the RN 108(1) via the radio link 112(1). The RN 108(1) will then select a PDSN using the IP network 118. For purposes of this example, it is assumed that the RN 108(1) has selected, via the IP network 118, the PDSN 120(1) to handle the PPP session of the mobile station 102(1) and that the system 100 is using the PPP register 126(1) and not the PPP register 126(2) or the PPP register 126(3).

The PDSN 120(1) will then inquire of the PPP register 126(1) to determine whether the PPP register 126(1) has stored a unique identifier, such as, for example, an International Mobile Station Identifier (IMSI), for the mobile station 102(1). The unique identifiers of the mobile station 102(1) allow the system 100 to uniquely identify the mobile station 102(1). The unique identifiers of mobile stations are stored by the PPP register 126(1) and are indexed so that a lookup can be performed to determine whether a PPP context for a particular mobile station has been stored. Although IMSIs are used herein as exemplary unique identifiers, any other identifier that uniquely identifies a mobile station can be used by the PPP register 126(1).

Location of the PPP register 126(1) can be accomplished by, for example, manual entry of the IP address of the PPP register 126(1) in the PDSN 120(1) or by a multicast mechanism. If manual entry is employed, a list of IP addresses of PPP registers, such as the PPP register 126(1), that can be used by the PDSN 120(1) is input into the PDSN 120(1). When the PDSN 120(1) searches for a PPP context for a particular mobile station, such as the mobile station 102(1), the PDSN 120(1) can query the PPP registers that were input into the PDSN 120(1). If a multicast mechanism is employed, a multicast address and port are reserved for PPP registers, such as the PPP register 126(1). When the PDSN 120(1) searches for a PPP context for a particular mobile station, such as the mobile station 102(1), the PDSN 120(1) sends a query on the multicast address and port. PPP Registers that listen on the multicast address and port, such as the PPP register 126(1), respond to the PDSN 120(1) so that the PDSN 120(1) receives a response from each of the PPP registers that can be reached through the multicast address and port.

If the PPP register 126(1) does not have the IMSI of the mobile station 102(1) in its database, it will inform the PDSN 120(1) of this fact. Absence of the IMSI of the mobile station 102(1) in the PPP register 126(1) means that there is no pending PPP session involving the mobile station 102(1). In other words, this is a new PPP session for the mobile station 102(1). Therefore, a complete PPP session negotiation for the mobile station 102(1) must be performed to obtain the PPP context. In response to the absence of the IMSI of the mobile station 102(1), the PDSN 120(1) proceeds to completely negotiate the PPP session with the mobile station 102(1) without further reference to the PPP register 126(1). Following negotiation of the PPP session, the PDSN 120(1) informs the PPP register 126(1) of the newly created PPP context for the present PPP session of the mobile station 102(1). In addition, after the PPP session has been negotiated, the RN 108(1) periodically performs R-P registrations of the mobile station 102(1) with the PDSN 120(1) to keep the R-P connection between the RN 108(1) and the PDSN 120(1) alive; the PDSN 120(1) then updates the PPP register 126(1) to prevent a PPP context timeout from occurring.

If, as the PPP session is taking place, the mobile station 102(1) roams to another radio network, such as the RNT 108(2), one or more handovers of the mobile station 102(1)

occur. If the RN 108(2) is unable to resume the PPP session of the mobile station 102(1) with the same PDSN 120(1), but is able to contact, for example, a new PDSN 120(2), the PDSN 120(2) will inquire of the PPP register 126(1) as to whether the PPP register 126(1) has stored the IMSI of the mobile station 102(1). If the PPP register 126(1) has stored the IMSI of the mobile station 102(1), the PPP register 126(1) will return the previously-stored PPP context for the present PPP session of the mobile station 102(1) to the PDSN 120(2). Because PPP contexts for mobile stations engaged in pending PPP sessions are stored by the PPP register 126(1) and are indexed by IMSI, when the IMSI of a particular mobile station is being stored by the PPP register, this means that the particular mobile station is engaged in a pending PPP session and that its PPP context can be used to resume the PPP session. Following receipt of the PPP context by the PDSN 120(2), the PPP session can be resumed without any further PPP negotiation or creation of a new PPP context.

When L2TP is used in cdma2000, an L2TP Access Concentrator functionality (not shown) is performed by the PDSN to which the mobile station is connected. An L2TP Network Server (not shown) is a separate node from the PDSN. In contrast to, for example, Mobile IP and Simple IP, PPP negotiations made under L2TP are performed in two parts, a first part involving the L2TP Access Concentrator (i.e., the PDSN) and a second part involving the L2TP Network Server. While the present invention avoids re-negotiation of the first part of PPP negotiations under L2TP (the part involving a PDSN), the second part still needs to be re-negotiated upon an inter-PDSN handover.

If the R-P connection between the RN 108(2) and the PDSN 120(2) expires while the PDSN 120(2) is serving the mobile station 102(1), the PDSN 120(2) sends a message to the PPP register 126(1) directing the PPP register 126(1) to remove the PPP context of the mobile unit 102(1) (including its IMSI) so that the system 100 will know to completely negotiate the next PPP session involving the mobile station 102(1). Only the PDSN that last made a successful query of the PPP register regarding a particular PPP context (e.g., the PDSN 120(2)) is permitted to remove that PPP context from the PPP register 126(1). This prevents a PPP context from being removed by a PDSN that had been serving a mobile station prior to a handover of the mobile station (e.g., the PDSN 120(1)) to another PDSN (e.g., the PDSN 120(2)). The PDSN that served the mobile station before the handover (e.g., the PDSN 120(1)) does not receive R-P registration updates after the handover has occurred, which causes the R-P connection with the PDSN serving the mobile station before the handover (e.g., the PDSN 120(1)) to time out. If the PPP register 126(1) does not hear from any PDSN on behalf of the mobile station 102(1) for a predetermined amount of time, an expiration timer (not shown) expires and the PPP register 126(1) automatically removes the stored PPP context for the mobile station 102(1) from its database.

Reference is now made to FIG. 3 wherein there is shown a messaging diagram illustrating the flow of signals in the system 100 responsive to inter-PDSN mobile station roaming during a PPP session of a mobile station. It is assumed that the system is using the PPP register 126(1) and not the PPP register 126(2).

When the mobile station 102(1) desires to begin a PPP session, a connection message 202 is sent to the RN 108(1). Responsive to the message 202, the RN 108(1) sends an R-P connection message 204 to the PDSN 120(1) (assuming that the RN 108(1) has selected the PDSN 120(1)). In response to the R-P connection message 204, the PDSN 120(1) sends a Who Has International Mobile Station Identifier (IMSI) message 302 to the PPP register 126(1). Location of the PPP register 126(1) can be accomplished, for example, by manual entry of the IP address of the PPP register 126(1) in the PDSN 120(1) or by a multicast mechanism. Responsive to the Who Has IMSI message 302, the PPP register 126(1) returns an IMSI Unavailable message 304 to the PDSN 120(1), since this is a new PPP session and a PPP context has not previously been negotiated for the mobile station 102(1) for the present session.

In response to the IMSI Unavailable message 304, the PDSN 120(1) executes the PPP negotiation 206, which represents a complete negotiation of the PPP context for this session for the mobile station 202. Although the PPP negotiation 206 is represented by a single arrow in FIG. 3, it most typically comprises a plurality of messages. Following the PPP negotiation 206, the PDSN 120(1) sends an Add-Entry message 306 to the PPP register 126(1), which message directs the PPP register 126(1) to add to its database the PPP context for the mobile station 102(1) for the present PPP session, the PPP context being linked to the IMSI of the mobile station 102(1). Location of the PPP register 126(1) can be accomplished, for example, by manual entry of the IP address of the PPP register 126(1) in the PDSN 120(1) or by a multicast mechanism. In response to the Add-Entry message 306, the PPP register 126(1) adds the PPP context to its database and returns an Add-Entry Ack message 308 to the PDSN 120(1), indicating that it has received the Add-Entry message 306 from the PDSN 120(1) and has stored the PPP context for the mobile station 102(1) for the present session. Next, as shown by the PPP session message 208, the PPP session now takes place since PPP negotiation has been completed.

An inter-PDSN handover as described with respect to FIG. 2 is illustrated by the handover message 210 from the mobile station 102(1) to the radio network 108(2) and the R-P connection 212 made by the radio network 108(2) to the PDSN 120(2). In response to the R-P connection message 212, the PD SN 120(2) sends a Who Has IMSI message 302 to the PPP register 126(1). Location of the PPP register 126(1) can be accomplished, for example, by manual entry of the IP address of the PPP 126(1) in the PDSN 120(2) or by a multicast mechanism. In response to the Who Has IMSI message 302, the PPP register 126(1) sends an I Have IMSI message 310 to the PDSN 120(2). The I Have IMSI message 310 contains the PPP context for the present IP session for the mobile station 102(1), which PPP context was added to the PPP register 126(1) in response to an Add-Entry message 306.

Following receipt of the I Have IMSI message 310, the PDSN 120(2) can now continue the prior PPP session with the mobile station 102(1), as shown by the PPP session message 208 from the mobile station 102(1) to the PDSN 120(2). Receipt of the PPP context information for the present session of the mobile station 102(1) by the PDSN 120(2) enables the PDSN to resume the PPP session with the mobile station 102(1) without having to completely renegotiate the PPP context for the mobile station 102(1).

Also shown on the messaging diagram 300 is messaging for R-P periodic re-registration. R-P periodic re-registration can be performed as often as needed once a PPP context has been created. R-P periodic re-registration is illustrated by an R-P periodic re-registration message 312, which is sent from the RN 108(2) to the PDSN 120(2). In response to the R-P periodic re-registration message 312, the PDSN 120(2) refreshes the PPP register, so the PPP register does not timeout, by sending an Add Entry message 306 to the PPP register 126(1). In response to the Add Entry message 306, the PPP register 126(1) updates the expiration timer and responds with a Add Entry Ack message 306 to the PDSN 120(2).

Upon expiration of the R-P connection, the PDSN 120(2) sends a Remove Entry message 314 to the PPP register 126(1), which message directs the PPP register 126(1) to remove the PPP context from its database. Location of the PPP register 126(1) can be accomplished, for example, by manual entry of the IP address of the PPP register 126(1) in the PDSN 120(2) or by a multicast mechanism. The PPP register then removes the PPP context for the present session of the mobile station 102(1) and returns a Remove-Entry Ack message 316 to the PDSN 120(2).

When the R-P connection between the RN 108(1) and the PDSN 120(1) expires, the PDSN 120(2) sends a message to the PPP register 126(1) directing the PPP register 126(1) to remove the PPP context of the mobile unit 102(1) (including its IMSI) so that the system 100 will know to completely negotiate the next PPP session involving the mobile station 102(1). Only the PDSN that last made a successful query of the PPP register via a Who Has IMSI message regarding a particular PPP context (e.g., the PDSN 120(2)) is permitted to remove that PPP context from the PPP register 126(1). This prevents a PPP context from being removed by a PDSN that had been serving a mobile station prior to a handover of the mobile station (e.g., the PDSN 120(1)) to another PDSN (e.g., the PDSN 120(2)). The PDSN that served the mobile station before the handover (e.g., the PDSN 120(1)) does not receive R-P registration updates after the handover has occurred, which causes the R-P connection with the PDSN serving the mobile station before the handover (e.g., the PDSN 120(1)) to time out. If the PPP register does not hear from any PDSN on behalf of the mobile station 102(1) for a predetermined amount of time, the expiration timer expires and the PPP register 126(1) automatically removes the stored PPP context for the mobile station 102(1) from its database.

Although preferred embodiments of the method and system of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A method of executing a Point-to-Point Protocol (PPP) session comprising the steps of:
   negotiating a PPP session for a mobile station on a first Packet Data Service Node (PDSN), the step of negotiating including the step of creating a PPP context relative to that mobile station;
   storing the PPP context for that mobile station;
   handing over of the mobile station from the first PDSN to a second PDSN;
   retrieving the stored PPP context for use by the second PDSN; and
   resuming the PPP session on the second PDSN using the retrieved PPP context.

2. The method of claim 1 wherein the PPP session is executed in a cdma2000 network.

3. The method of claim 1 further comprising the step of determining the location of the stored PPP context.

4. The method of claim 3 wherein the step of determining the location of the stored PPP context is accomplished by manual entry of an IP address of a PPP register storing the PPP context.

5. The method of claim 3 wherein the step of determining the location of the stored PPP context is accomplished by a multicast mechanism.

6. The method of claim 1 wherein the step of retrieving comprises the step of determining whether a PPP context relative to the mobile station has been previously stored.

7. The method of claim 6 wherein the step of determining whether a PPP context relative to the mobile station is stored is performed by the second PDSN.

8. The method of claim 6 further comprising the step of creating a PPP context relative to the mobile station in response to a determination that a PPP context relative to the mobile station has not been stored.

9. The method of claim 8 further including the steps of having the first PDSN sending a message to the PPP register directing the PPP register to store the PPP context.

10. The method of claim 1 further comprising the step of periodically updating the PPP context on the PPP register.

11. The method of claim 1 further comprising the step of periodically updating the stored PPP context during the PPP session.

12. The method of claim 1 further comprising the steps of:
    terminating the PPP session; and
    deleting the PPP context relative to the at least one mobile station in response to the termination of the PPP session.

13. The method of claim 12 wherein the step of deleting the PPP context comprises the step of the second PDSN sending a message to a PPP register directing the PPP register to remove the PPP context.

14. A wireless communication system for providing Packet Data Services to a mobile station, comprising:
    a first Packet Data Service Node (PDSN) engaging in a PPP session with a mobile station, that PPP session having an associated PPP context;
    a Point-to-Point (PPP) register storing the PPP context relative to the mobile station and its PPP session; and
    a second PDSN to which the mobile station is handed over, the second PDSN retrieving the stored PPP context from the PPP register for use in resuming the PPP session with the mobile station following the handover.

15. The system of claim 14 further comprising:
    a Radio Network (RN) providing wireless communications with the mobile station; and
    an Internet Protocol (IP) network interconnecting the RN with the PDSN.

16. The system of claim 14 wherein the associated PPP context relative to the mobile station is communicated to the PPP register by the first PDSN.

17. The system of claim 14 wherein the mobile station operates according to cdma2000.

18. The system of claim 14 wherein the mobile station is handed over from the first PDSN to the second PDSN during the PPP session.

19. The system of claim 14 wherein the PPP register comprises a standalone node.

20. The system of claim 14 wherein the PPP register is co-located in one of the PDSNs.

21. The system of claim 14 wherein the PPP context is periodically updated on the PPP register.

22. The system of claim 14 wherein, in response to termination of the PPP session, the PPP context relative to the mobile station is deleted from the PPP register.

* * * * *

UNITED STATES PATENT AND TRADEMARK OFFICE
CERTIFICATE OF CORRECTION

PATENT NO. : 6,876,640 B1
APPLICATION NO. : 09/702175
DATED : April 5, 2005
INVENTOR(S) : Jean-Francois Bertrand et al.

Page 1 of 1

It is certified that error appears in the above-identified patent and that said Letters Patent is hereby corrected as shown below:

In Column 2, Line 5, delete "routine" and insert -- routing --, therefor.

In Column 2, Line 33, delete "LPSec" and insert -- IPSec --, therefor.

Signed and Sealed this

First Day of April, 2008

JON W. DUDAS
*Director of the United States Patent and Trademark Office*